US012165639B2

(12) United States Patent
Garg et al.

(10) Patent No.: US 12,165,639 B2
(45) Date of Patent: Dec. 10, 2024

(54) SYSTEM AND METHOD FOR PROVIDING CONTEXTUAL FEEDBACK IN RESPONSE TO A COMMAND

(71) Applicant: HONEYWELL INTERNATIONAL INC., Charlotte, NC (US)

(72) Inventors: Chaya Garg, Plymouth, MN (US); Anil Kumar Songa, Bangalore (IN); Ravi Tupakula, Bangalore (IN); Vasantha Paulraj, Madurai (IN); Mahesh Kumar Sampath, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 513 days.

(21) Appl. No.: 17/398,609

(22) Filed: Aug. 10, 2021

(65) Prior Publication Data

US 2022/0084517 A1 Mar. 17, 2022

(30) Foreign Application Priority Data

Sep. 17, 2020 (IN) .............................. 202011040248

(51) Int. Cl.
*G10L 15/22* (2006.01)
*G06F 16/432* (2019.01)
(Continued)

(52) U.S. Cl.
CPC ............ *G10L 15/22* (2013.01); *G06F 16/433* (2019.01); *G08G 5/0021* (2013.01); *G10L 15/26* (2013.01); *G10L 2015/223* (2013.01)

(58) Field of Classification Search
CPC ... G10L 15/22; G10L 15/26; G10L 2015/223; G06F 16/433; G08G 5/0021
See application file for complete search history.

(56) References Cited

U.S. PATENT DOCUMENTS 6,233,560 B1 5/2001 Tannenbaum
9,824,689 B1 * 11/2017 Shapiro .................. G10L 15/22
(Continued)

FOREIGN PATENT DOCUMENTS

| EP | 0336581 A2 * 10/1989 |
| KR | 20130053803 A * 5/2013 |
| WO | 02/09093 A1 1/2002 |

*Primary Examiner* — Anne L Thomas-Homescu
(74) *Attorney, Agent, or Firm* — Lorenz & Kopf LLP

(57) ABSTRACT

A voice recognition system in an aircraft is provided. The voice recognition system includes: a voice recognition controller configured to receive a voice command from a flight crew member voice interface, convert the voice command to an avionics system command, and forward the avionics system command to an avionics system for execution. The voice recognition system further includes an application controller configured to: receive the avionics system command that has been converted from the voice command; determine whether the avionics system command can be performed; cause the avionics system command to be performed when it is determined that the avionics system command can be performed; and when it is determined that the avionics system command cannot be performed, generate a message that provides a reason why the avionics system command cannot be performed and cause the message to be displayed on a display device and/or annunciated on an aural device.

13 Claims, 3 Drawing Sheets

(51) Int. Cl.
*G08G 5/00* (2006.01)
*G10L 15/26* (2006.01)

(56) References Cited

U.S. PATENT DOCUMENTS

| | | | |
|---|---|---|---|
| 2007/0136692 A1 | 6/2007 | Seymour et al. | |
| 2013/0197917 A1* | 8/2013 | Dong | G10L 15/183 |
| | | | 704/275 |
| 2014/0365226 A1* | 12/2014 | Sinha | G10L 15/22 |
| | | | 704/275 |
| 2016/0297543 A1* | 10/2016 | Li | G10L 15/183 |
| 2017/0365177 A1* | 12/2017 | Puentes | B64D 45/00 |
| 2020/0047687 A1* | 2/2020 | Camhi | G10L 15/22 |

* cited by examiner

SYSTEM AND METHOD FOR PROVIDING CONTEXTUAL FEEDBACK IN RESPONSE TO A COMMAND

CROSS REFERENCE TO RELATED APPLICATION

This application claims priority to Indian Provisional Patent Application No. 202011040248, filed Sep. 17, 2020, the entire content of which is incorporated by reference herein.

TECHNICAL FIELD

Embodiments of the subject matter described herein relate generally to voice recognition systems. More particularly, embodiments of the subject matter relate to systems and methods for providing feedback regarding the performance of a received voice command.

BACKGROUND

A voice recognition controller in an electronic system may have the ability to recognize keywords spoken by a user and generate corresponding outputs, for example, commands or text-strings, for use by an application device. In the context of an aircraft, a voice recognition controller may successfully recognize a command and transfer the command to an appropriate aircraft component. The successfully recognized command, however, may not result in a target application actually performing actions requested via the command.

When a voice command is successfully recognized but not executed, a user of the system may not know why the voice command was not executed. Contextual feedback explaining why a command has not been executed is not provided. If an explanation is desired, a user must manually scroll through system screens to determine why a recognized command was not executed. In the context of an aircraft, manually scrolling through screens to determine why a recognized voice command was not executed can increase flight crew workload and reduce the advantages of voice recognition systems.

Hence, it is desirable to provide systems and methods for automatically alerting a user as to why a recognized voice command was not executed. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A voice recognition system in an aircraft is provided. The voice recognition system includes: a voice recognition controller configured to receive a voice command from a flight crew member voice interface, convert the voice command to an avionics system command, and forward the avionics system command to an avionics system for execution. The voice recognition system further includes an application controller configured to: receive the avionics system command that has been converted from the voice command; determine whether the avionics system command can be performed; cause the avionics system command to be performed when it is determined that the avionics system command can be performed; and when it is determined that the avionics system command cannot be performed, generate a message that provides a reason why the avionics system command cannot be performed and cause the generated message to be displayed on a display device and/or annunciated on an aural device.

A flight deck system in an aircraft for executing voice commands is provided. The system is configured to: receive a voice command from a flight crew member voice interface; convert the voice command to an avionics system command; determine whether the avionics system command can be performed; cause the avionics system command to be performed when it is determined that the avionics system command can be performed; and when it is determined that the avionics system command cannot be performed, generate a message that provides a reason why the avionics system command cannot be performed and cause the message to be displayed on a display device and/or annunciated on an aural device.

A method in an aircraft for executing voice commands is provided. The method includes: receiving a voice command from a flight crew member voice interface; converting the voice command to an avionics system command; determining whether the avionics system command can be performed; causing the avionics system command to be performed when it is determined that the avionics system command can be performed; and when it is determined that the avionics system command cannot be performed, generating a message that provides a reason why the avionics system command cannot be performed and causing the message to be displayed on a display device and/or annunciated on an aural device.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
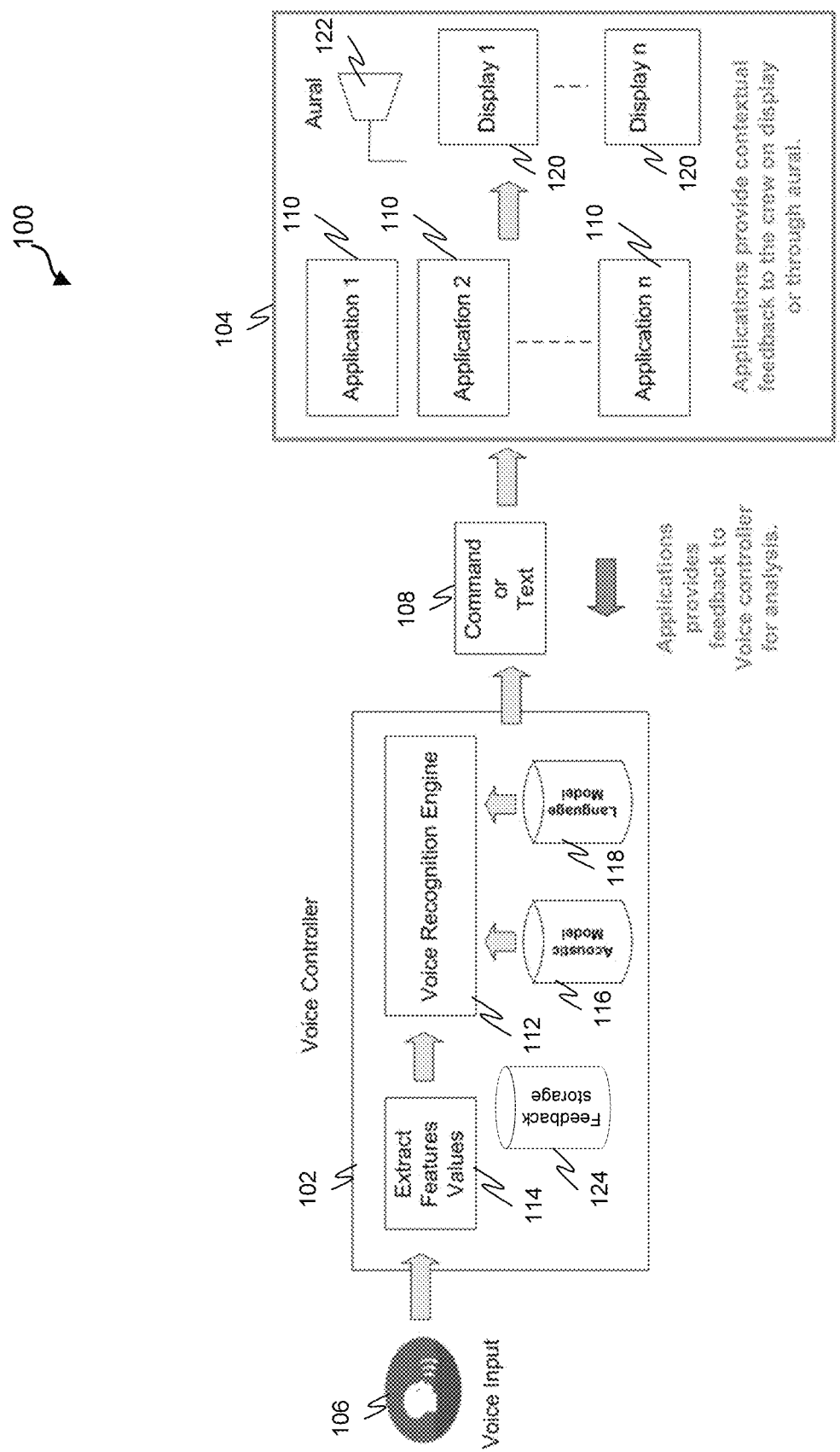
FIG. 1 is a block diagram depicting an example aircraft system that includes a voice recognition controller, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, and articles for providing contextual feedback to flight crew regarding the execution of a voice command by an application executing on avionics equipment in an aircraft. The apparatus, systems, techniques and articles disclosed herein can provide that an application that is responsible for executing an avionics system command identified via the voice command to provide feedback to the flight crew on the status of execution initiation, progression, and completion status of the avionics system command execution. The apparatus, systems, techniques, and articles disclosed herein can provide that the application, when execution success occurs, provides relevant information regarding the execution status. The apparatus, systems, techniques, and articles disclosed herein can provide that the application, when execution failure occurs, provides relevant information regarding the cause of the execution failure. The relevant information regarding the cause of the execution failure may be displayed on a cockpit display device and/or annunciated via an aural device (e.g., P.A. system or speaker). The apparatus, systems, techniques, and articles disclosed herein can provide that the application, when execution success occurs, causes relevant data to be displayed on a cockpit display and/or annunciated via an aural device.

Unsuccessful command execution might result from one or multiple factors. Command execution may depend on other functions in the system, hardware (HW) status, limitations, and/or failures, software (SW) status, limitations, and/or failures, and crew action. The apparatus, systems, techniques and articles disclosed herein can provide a flight crew with information to understand how a voice command was executed by avionics equipment and/or why a failure occurred to allow the flight crew to undo a command if desired. The apparatus, systems, techniques, and articles disclosed herein can provide contextual details by default and/or on request for successful and/or unsuccessful execution.

FIG. 1 is a block diagram depicting an example aircraft system 100. The example aircraft system 100 includes a voice recognition controller 102 and other avionics systems 104. The example voice recognition controller 102 is a device that is configured to recognize keywords from voice input (e.g., a voice command) 106 spoken by a crew member and generate corresponding outputs, such as, commands or text-strings 108, for use by an application controller 110.

The voice recognition controller 102 is configured to receive voice input 106 from a flight crew member voice interface (e.g., a microphone or a flight crew member headset that includes a microphone) and extract feature values from the voice input 106. The voice recognition controller 102 includes a voice recognition engine 112 and is configured to pass the extracted feature values 114 from the voice input 106 to the voice recognition engine 112.

The voice recognition engine 112 is configured to convert the extracted feature values 114 into one or more commands and/or text-strings 108. The voice recognition engine 112 is configured to access an acoustic model 116, which represents the statistical relationship between an audio signal and the phonemes or other linguistic units that make up speech and is learned from a set of audio recordings and their corresponding transcripts, and a language model 118, which is a file containing the probabilities of sequences of words. The voice recognition engine 112 uses the acoustic model 116 and the language model 118 to recognize a spoken phrase (e.g., a text command).

The voice recognition controller 102 accesses a voice keyword table (e.g., post processing module) that includes a plurality of voice recognizable keywords and corresponding application instructions. The voice recognition controller 102 is configured to match the recognized spoken phrase to a voice recognizable keyword to determine a corresponding application instruction (e.g., an avionics system command) The voice recognition controller 102 passes the corresponding application instruction as one or more commands or text-strings 108 to an application controller 110.

The application controller 110 is configured to perform the corresponding application instruction. Performing the application instruction may result in many different types of avionics functions being performed such as causing a graphical user interface (GUI) to be displayed on one or more cockpit display devices 120, activating interactive navigation functions (e.g., airport layers on/off, map range selection, weather products selection), radio tuning (e.g., VHF, NAV tuning), reading out checklist items, updating status of checklist items, configuring windows, adjusting volume, setting timers and alerts, and others.

The example voice recognition controller 102 includes at least one processor and a computer-readable storage device or media encoded with programming instructions for configuring the controller 102. Similarly, the application controller 110 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The application controller 110 is also configured to provide contextual feedback regarding the performance of the application instruction. The contextual feedback is provided after a voice input 106 has been successfully recognized and converted to an application instruction. The contextual feedback may be provided using one or more display devices 120 and/or via an aural device 122 such as a speaker, headset, or P.A. (public address) system. The contextual feedback may be provided in a separate window on a display device 120 or integrated within an existing window structure.

The contextual feedback may identify the application instruction and a reason why the application instruction could not be executed. Reasons for application instruction not being capable of execution include a hardware failure, a software failure, data needed for instruction execution may not be available yet (e.g., data in process of being prepared for use), flight crew action needed, hardware or software not being in a compatible state, among others.

When an application instruction is received, the application controller 110 is configured to determine whether the application instruction can be performed. To determine whether the application instruction can be performed, the application controller 110 may be configured to identify parameters for determining whether the application instruction can be performed; identify the state of the parameters; and identify whether the state of the parameters indicate that the application instruction can be performed.

As an example, the voice input may be "SHOW SXM WINDS" and the parameters to be checked may be "If SXM Icing product is already selected." In this example, if SXM Icing is selected, voice command "SHOW SXM WINDS" cannot be executed. As a result, the visual and/or aural feedback may be "WINDS cannot be selected as ICING is selected. WINDS and ICING are mutually exclusive."

In another example, the voice input may be "SHOW KILO DELTA VICTOR TANGO AIRPORT CHART," the corresponding text would be "SHOW KDVT CHART", and the parameters to be checked may be "If KDVT airport chart is available in the charts database." In this example, if it is not available, KDVT chart cannot be displayed and command cannot be executed. As a result, the visual and/or aural feedback may be "KDVT chart unavailable in database."

When it is determined that an application instruction can be performed, the application controller 110 is configured to cause the application instruction to be performed. The application controller 110 is configured to generate positive contextual feedback indicating that the application instruction has been performed, when such positive contextual feedback is useful. The generated positive contextual feedback may be provided using one or more display devices 120 and/or via an aural device 122.

When it is determined that the application instruction cannot be performed, the application controller 110 is configured to generate explanatory contextual feedback providing a reason why the application instruction cannot be performed. The explanatory contextual feedback may be in the form of a general message that provides a general reason why the application instruction cannot be performed and may be provided using one or more display devices 120 and/or via an aural device 122. The general message may be associated with one or more parameter states that indicate that the application instruction cannot be performed and the general message may be generated based on the one or more parameter states that indicate that the application instruction cannot be performed.

The explanatory contextual feedback may be in the form of a detailed message that provides a detailed reason why the application instruction cannot be performed. The detailed message may include one or more parameters values indicating that the application instruction cannot be performed. The explanatory contextual feedback may be provided using one or more display devices 120 and/or via an aural device 122.

The detailed message may be provided in response to flight crew inquiry regarding why the application instruction cannot be performed. The flight crew inquiry may be received as a voice inquiry from a flight crew member voice interface.

The voice recognition controller 102 may be configured to receive an error inquiry voice command from a flight crew member voice interface, engage the voice recognition engine 112 (e.g., execute voice recognition software) to convert the error inquiry voice command into an error inquiry text command (e.g., using the acoustic model 116 and the language model 118), access a voice keyword table (e.g., error inquiry database) that includes a plurality of voice recognizable keywords and corresponding avionics system error inquiry commands, convert the error inquiry text command to an avionics system error inquiry command using the error inquiry database, and forward the avionics system error inquiry command as one or more commands or text-strings 108 to an application controller 110.

The application controller 110 may be configured to respond to the avionics system error inquiry command by providing a detailed message that provides a detailed reason why the application instruction cannot be performed. The application controller 110 may be configured to respond by identifying the one or more parameters for determining whether the application instruction can be performed, identify one or more parameter that indicate that the application instruction cannot be performed, retrieve the state of the one or more parameter that indicate that the application instruction cannot be performed, generate a detailed message that provides a detailed reason including the state of the one or more parameter that indicate that the application instruction cannot be performed, and cause the detailed message to be displayed on the display device 120 and/or annunciated on the aural device 122.

The flight crew inquiry may be received as a manually entered error inquiry command via a user interface such as one associated with one or more of the display devices 120. When a manually entered error inquiry command is received, the application controller 110 may be configured to convert the error inquiry command into to an avionics system error inquiry command, identify the one or more parameters for determining whether the application instruction can be performed, identify one or more parameter that indicate that the application instruction cannot be performed, retrieve the state of the one or more parameter that indicate that the application instruction cannot be performed, generate a detailed message that provides a detailed reason including the state of the one or more parameter that indicate that the application instruction cannot be performed, and cause the detailed message to be displayed on the display device 120 and/or annunciated on the aural device 122.

The application controller 110 may also be configured to send contextual feedback (e.g., a state of one or more parameters for determining whether the application instruction can be performed) to the voice controller 102 for storage in a feedback storage datastore 124 and/or analysis. The contextual feedback may be studied to determine if there are any gross inaccuracies and if speech models can be further enhanced.

Figure 2B:
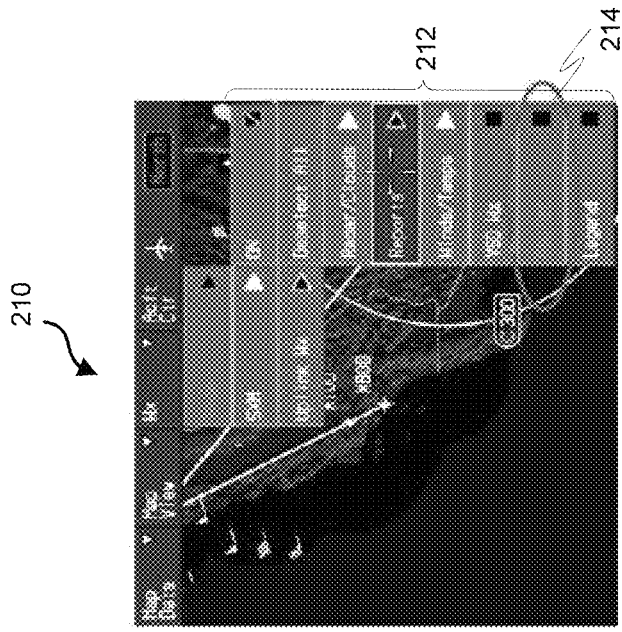
FIG. 2B is a diagram depicting an alternate way of retrieving contextual feedback on a navigational display regarding why a voice command was not executed, in accordance with some embodiments.
Figure 2A:
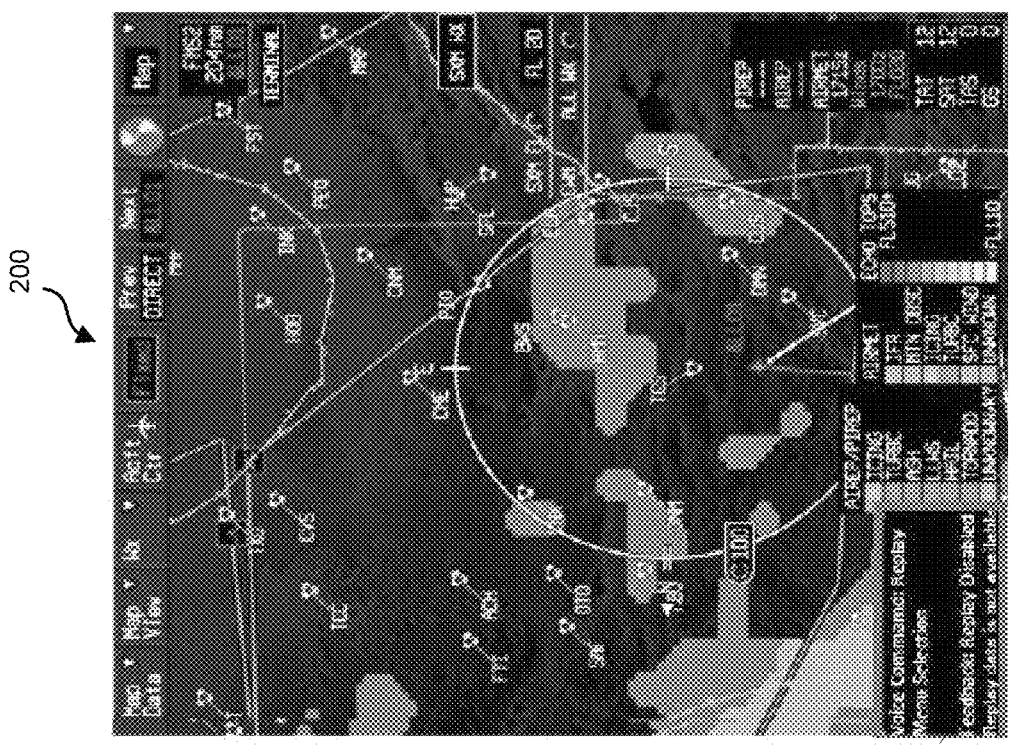
FIG. 2A is a diagram depicting example contextual feedback provided by an application controller on a navigational display, in accordance with some embodiments.

FIG. 2A is a diagram depicting example contextual feedback 202 provided by an application controller on a navigational display 200. The contextual feedback 202 is provided as a visual message in a display window on the navigational display 200.

In this example, in response to a voice command requesting a replay of weather data, the application controller determines whether an avionics system command to display a replay of weather data can be performed. The application controller determines that the avionics system command to display a replay of weather data cannot be performed because replay data does not exist to be replayed. The avionics system, in this example, needs to accumulate 30 minutes of weather data before it can replay the weather data.

When the application controller determines that the avionics system command to display a replay of weather data cannot be performed, the application controller causes contextual feedback 202 to be displayed on the navigation display 200. The contextual feedback 202, in this example, identifies the voice command, "Replay", and identifies the reason why the voice command cannot be executed, "Replay Disabled", and the reason that Replay is disabled, "Required replay data is not accumulated."

FIG. 2B is a diagram depicting an alternate way of retrieving contextual feedback on a navigational display 210 regarding why a voice command was not executed. In this example, in response to a voice command requesting a replay of weather data, the application controller determines whether an avionics system command to display a replay of weather data can be performed. The application controller determines that the avionics system command to display a replay of weather data cannot be performed, for example, because replay data does not exist to be replayed. The avionics system, in this example, needs to accumulate 30 minutes of weather data before it can replay the weather data.

In this example, a menu structure 212 has been retrieved through scrolling through a menu. The menu structure 212 reveals that Replay has been disabled through the "Replay" selection option 214 being greyed out. This menu structure 212 may be retrieved through manual entry of an inquiry via a user interface or via voice commands using a voice controller.

Figure 3:
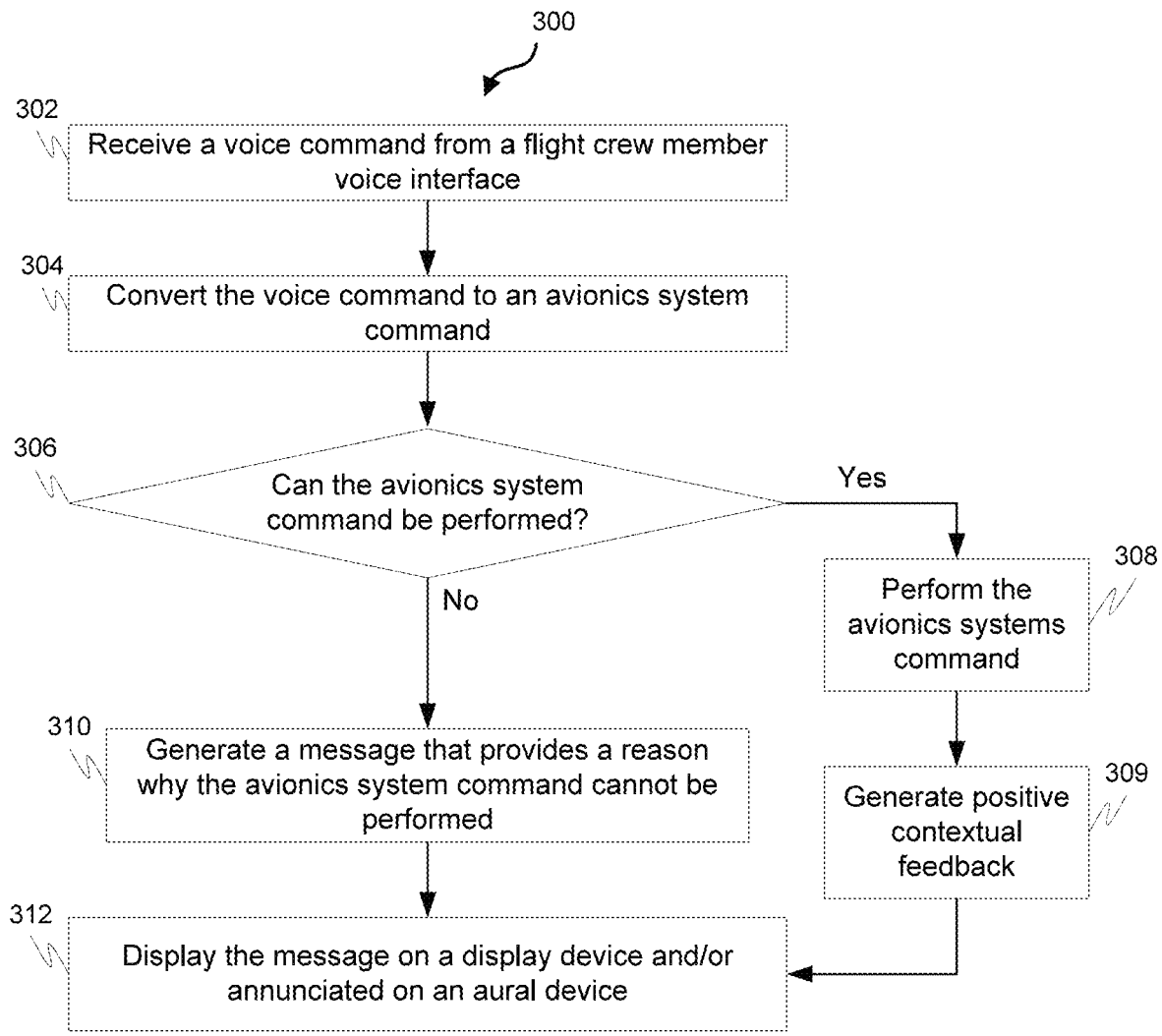
FIG. 3 is a process flow chart depicting an example process in an aircraft for executing voice commands and providing contextual feedback, in accordance with some embodiments.

FIG. 3 is a process flow chart depicting an example process 300 in an aircraft for executing voice commands and providing contextual feedback. The order of operation within the process 300 is not limited to the sequential execution as illustrated in the figure, but may be performed in one or more varying orders as applicable and in accordance with the present disclosure.

The example process 300 includes receiving a voice command from a flight crew member voice interface (operation 302) and converting the voice command to an avionics system command (operation 304). The voice command may be converted by a voice controller (e.g., voice controller 102). The converting the voice command to the avionics system command may comprise: executing voice recognition software (e.g., via voice recognition engine 112) to convert the voice command into a text command, accessing a post processing module in response to receiving the voice command and/or in response to converting the voice command to a text command, and converting the text command to an avionics system command using the post processing module. The post processing module can generate interpreted text by processing the voice recognition engine decoded text to remove any errors and can use configuration files for mapping interpreted text to an avionics system command. The configuration files may contain configuration information to support: order independent grammar and alternate vocabulary, variations in phraseology, correction of speech recognition errors, removing filler words and um/ah sounds, a map table to translate a valid phrase to an avionics system commands, and data validations, post processing module The example process 300 includes determining whether the avionics system command can be performed (decision 306) and performing the avionics systems command when the command can be performed (operation 308). Determining whether the avionics system command can be performed may comprise: identifying parameters for determining whether the avionics system command can be performed, identifying the state of the parameters, and identifying whether the state of the parameters indicate that the avionics system command can be performed. Also, when it is determined that the avionics system command can be performed, positive contextual feedback may be provided indicating the status of avionics system command performance (operation 309) and the positive contextual feedback may be displayed on a display device and/or annunciated on an aural device (operation 312).

When it is determined that the avionics system command cannot be performed, the example process 300 includes generating a message that provides a reason why the avionics system command cannot be performed (operation 310). Generating the message that provides the reason why the avionics system command cannot be performed may comprise: identifying a parameter state that indicates that the avionics system command cannot be performed, and generating a message that provides a reason why the avionics system command cannot be performed based on the parameter state that indicate that the avionics system command cannot be performed. The example process 300 also includes displaying the message on a display device and/or annunciated on an aural device (operation 312).

Described herein are apparatus, systems, techniques, and articles for providing contextual feedback for voice commands that are not performed. The apparatus, systems, techniques, and articles provided herein can consider an application status, dependencies on different systems, application internal dependencies and other conditions to identify causes that may have contributed to an application's failure to execute a spoken command.

In one embodiment, a voice recognition system in an aircraft is provided. The voice recognition system comprises: a voice recognition controller configured to receive a voice command from a flight crew member voice interface, convert the voice command to an avionics system command, and forward the avionics system command to an appropriate application controller. The voice recognition system further comprises an application controller configured to: receive the avionics system command that has been converted from the voice command; determine whether the avionics system command can be performed; cause the avionics system command to be performed when it is determined that the avionics system command can be performed; and when it is determined that the avionics system command cannot be performed, generate a message that provides a reason why the avionics system command cannot be performed and cause the message to be displayed on a display device and/or annunciated on an aural device.

These aspects and other embodiments may include one or more of the following features. To convert the voice command to the avionics system command, the voice recognition controller may be configured to: execute voice recognition software to convert the voice command into a text command, access a post processing module in response to receiving the voice command and/or in response to converting the voice command to a text command, and convert the text command to an avionics system command using the post processing module. To determine whether the avionics system command can be performed, the application controller may be configured to: identify first parameters for determining whether the avionics system command can be performed, identify a state of the first parameters, and identify whether the state of the first parameters indicate that the avionics system command can be performed. To generate the message that provides the reason why the avionics system command cannot be performed, the application controller may be configured to: identify the first parameter states that indicate that the avionics system command cannot be performed, and generate the message that provides the reason why the avionics system command cannot be performed based on the first parameter states that indicate that the avionics system command cannot be performed. The voice recognition controller may be further configured to: receive an error inquiry voice command from a flight crew member voice interface, execute voice recognition software to convert the error inquiry voice command into an error inquiry text command, access an error inquiry database in response to receiving the error inquiry voice command and/or in response to converting the error inquiry voice command to an error inquiry text command, convert the error inquiry text command to an avionics system error inquiry command using the error inquiry database, and forward the avionics system error inquiry command to the appropriate application. The application controller may be further configured to: receive the avionics system error inquiry command, identify one or more parameters for determining whether the avionics system command can be performed, identify a first parameter that indicates that the avionics system command cannot be performed, retrieve a state of the first parameter, generate a detailed message that provides a detailed reason including the state of the first parameter that indicates that the avionics system command cannot be performed, and cause the detailed message to be displayed on the display device and/or annunciated on the aural device. The application controller may be further configured to: receive a manually entered error inquiry command via a user interface, convert the error inquiry command into to an avionics system error inquiry command, identify one or more parameters for determining whether the avionics system command can be performed, identify a first parameter that indicates that the avionics system command cannot be performed, retrieve a state of the first parameter, generate a detailed message that provides a detailed reason including the state of the first parameter that indicates that the avionics system command cannot be performed, and cause the detailed message to be displayed on the display device and/or annunciated on the aural device. The application controller may be further configured to: automatically generate an avionics system error inquiry command, identify one or more parameters for determining whether the avionics system command can be performed, identify a first parameter that indicates that the avionics system command cannot be performed, retrieve a state of the first parameter, generate a detailed message that provides a detailed reason including the state of the first parameter that indicates that the avionics system command cannot be performed, and cause the detailed message to be displayed on the display device and/or annunciated on the aural device. The application controller may be further configured to send a state of one or more parameters for determining whether the avionics system command can be performed to the voice recognition controller for storage and/or analysis.

In another embodiment, a flight deck system in an aircraft for executing voice commands is provided. The flight deck system is configured to: receive a voice command from a flight crew member voice interface; convert the voice command to an avionics system command; determine whether the avionics system command can be performed; cause the avionics system command to be performed when it is determined that the avionics system command can be performed; and when it is determined that the avionics system command cannot be performed, generate a message that provides a reason why the avionics system command cannot be performed, and cause the message to be displayed on a display device and/or annunciated on an aural device.

These aspects and other embodiments may include one or more of the following features. To convert the voice command to the avionics system command, the flight deck system may be configured to: execute voice recognition software to convert the voice command into a text command, access a post processing module in response to receiving the voice command and/or in response to converting the voice command to a text command, and convert the text command to an avionics system command using the post processing module. To determine whether the avionics system command can be performed, the flight deck system further configures the processor to: identify first parameters for determining whether the avionics system command can be performed, identify a state of the first parameters, and identify whether the state of the first parameters indicate that the avionics system command can be performed. To generate the message that provides the reason why the avionics system command cannot be performed, the flight deck system may be further configured to: identify the first parameter states that indicate that the avionics system command cannot be performed, and generate the message that provides the reason why the avionics system command cannot be performed based on the first parameter states that indicate that the avionics system command cannot be performed. The flight deck system may be further configured to: receive an error inquiry voice command from a flight crew member voice interface, execute voice recognition software to convert the error inquiry voice command into an error inquiry text command, access an error inquiry database in response to receiving the error inquiry voice command and/or in response to converting the error inquiry voice command to an error inquiry text command, convert the error inquiry text command to an avionics system error inquiry command using the post processing module, and forward the avionics system error inquiry command to the appropriate application.

The flight deck system may be further configured to: receive the avionics system error inquiry command, identify one or more parameters for determining whether the avionics system command can be performed, identify a first parameter that indicates that the avionics system command cannot be performed, retrieve a state of the first parameter, generate a detailed message that provides a detailed reason including the state of the first parameter that indicates that the avionics system command cannot be performed, and cause the detailed message to be displayed on the display device and/or annunciated on the aural device.

The flight deck system may be further configured to: receive a manually entered error inquiry command via a user interface, convert the error inquiry command into to an avionics system error inquiry command, identify one or more parameters for determining whether the avionics system command can be performed, identify a first parameter that indicates that the avionics system command cannot be performed, retrieve a state of the first parameter, generate a detailed message that provides a detailed reason including the state of the first parameter that indicates that the avionics system command cannot be performed, and cause the detailed message to be displayed on the display device and/or annunciated on the aural device.

In another embodiment, a method in an aircraft for executing voice commands is provided. The method comprises: receiving a voice command from a flight crew member voice interface; converting the voice command to an avionics system command; determining whether the avionics system command can be performed; causing the avionics system command to be performed when it is determined that the avionics system command can be performed; and when it is determined that the avionics system command cannot be performed, generating a message that provides a reason why the avionics system command cannot be performed, and causing the message to be displayed on a display device and/or annunciated on an aural device.

These aspects and other embodiments may include one or more of the following features. The converting the voice command to the avionics system command may comprise: executing voice recognition software to convert the voice command into a text command, accessing a post processing module in response to receiving the voice command and/or in response to converting the voice command to a text command, and converting the text command to an avionics system command using the post processing module. Determining whether the avionics system command can be performed may comprise: identifying first parameters for determining whether the avionics system command can be performed, identifying a state of the first parameters, and identifying whether the state of the first parameters indicate that the avionics system command can be performed. Generating the message that provides the reason why the avionics system command cannot be performed may comprise: identifying the first parameter states that indicate that the avionics system command cannot be performed, and generating the message that provides the reason why the avionics system command cannot be performed based on the first parameter states that indicate that the avionics system command cannot be performed. The method may further comprise: receiving an error inquiry voice command from a flight crew member voice interface, executing voice recognition software to convert the error inquiry voice command into an error inquiry text command, accessing an error inquiry database in response to receiving the error inquiry voice command and/or in response to converting the error inquiry voice command to an error inquiry text command, converting the error inquiry text command to an avionics system error inquiry command using the post processing module, and forwarding the avionics system error inquiry command to the appropriate application. The method may further comprise: receiving the avionics system error inquiry command, identifying one or more parameters for determining whether the avionics system command can be performed, identifying a first parameter that indicates that the avionics system command cannot be performed, retrieving a state of the first parameter, generating a detailed message that provides a detailed reason including the state of the first parameter that indicates that the avionics system command cannot be performed, and causing the detailed message to be displayed on the display device and/or annunciated on the aural device. The method may further comprise: receiving a manually entered error inquiry command via a user interface, converting the error inquiry command into to an avionics system error inquiry command, identifying one or more parameters for determining whether the avionics system command can be performed, identifying a first parameter that indicates that the avionics system command cannot be performed, retrieving a state of the first parameter, generating a detailed message that provides a detailed reason including the state of the first parameter that indicates that the avionics system command cannot be performed, and causing the detailed message to be displayed on the display device and/or annunciated on the aural device.

In another embodiment, a voice recognition system in an aircraft is provided. The voice recognition system comprises: a voice recognition controller configured to: receive a voice command from a flight crew member voice interface; execute voice recognition software to convert the voice command into a text command; access a post processing module in response to receiving the voice command and/or in response to converting the voice command to a text command; convert the text command to an avionics system command using the post processing module; and forward the avionics system command to an appropriate application. The voice recognition system further comprises an application comprising programming instructions for configuring a processor to perform an avionics system function in response to the avionics system command, the application further configuring the processor to: receive the avionics system command; process the avionics system command; determine whether the avionics system command can be performed; identify parameters for determining whether the avionics system command can be performed; identify state of the parameters; identify whether state of the parameters indicate that the avionics system command can be performed; cause the avionics system command to be performed when it is determined that the avionics system command can be performed; when it is determined that the avionics system command cannot be performed: identify parameter states that indicate that the avionics system command cannot be performed; generate a message that provides a reason why the avionics system command cannot be performed based on the parameter states; cause the message to be displayed on a display device and/or annunciated on an aural device; and send the parameter states and/or general states to the voice recognition controller.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A voice recognition system in an aircraft comprising:
   a voice recognition controller configured to:
      receive a voice command from a voice interface;
      convert the voice command to an avionics system command; and
      forward the avionics system command to an appropriate application controller;
   a first application controller configured to:
      receive the avionics system command;
      determine whether the avionics system command can be performed;
      perform the avionics system command when it is determined that the avionics system command can be performed; and
      provide a feedback when it is determined that the avionics system command cannot be performed;
   a user interface configured to enter an error inquiry voice command in response to the feedback;
   an error inquiry controller configured to:
      receive the error inquiry voice command from the user interface;
      convert the error inquiry voice command to an avionic system inquiry;
      forward the avionic system inquiry to the appropriate application controller; and
   a second application controller configured to:
      receive the avionic system inquiry from the error inquiry controller;
      identify one or more parameters indicating that the avionics system command cannot be performed;
      retrieve a state of the one or more parameters; and
      generate a message for a navigational display device, the message including a detailed reason for not performing the avionics system command including the one or more parameters and the retrieved state thereof; and forward the message to the navigational display device in response to the error inquiry voice command.

2. The voice recognition system of claim 1, wherein:

the user interface is further configured to manually enter a manually entered error inquiry from a drop-down menu including a list of selectable error inquiries on a display; and the second application controller is further configured to:

receive the manually entered error inquiry; and convert the manually entered error inquiry into to the avionics system inquiry.

3. The voice recognition system of claim 1, wherein to convert the voice command to the avionics system command, the voice recognition controller is configured to:

execute voice recognition software to convert the voice command into a text command;

access a post processing module in response to converting the voice command to a text command; and convert the text command to an avionics system command using the post processing module.

4. The voice recognition system of claim 1, wherein the voice recognition controller is further configured as the user interface to:

execute voice recognition software to convert the error inquiry voice command into an error inquiry text command;

access an error inquiry database in response to receiving the error inquiry voice command and/or in response to converting the error inquiry voice command to an error inquiry text command;

convert the error inquiry text command to the avionics system inquiry using the error inquiry database; and forward the avionics system inquiry to the second application controller.

5. The voice recognition system of claim 1, wherein the first application controller is further configured to send a state of one or more parameters for determining whether the avionics system command can be performed to the voice recognition controller for storage and/or analysis.

6. A flight deck system in an aircraft for executing voice commands, the system configured to:

receive a voice command from a voice interface;

convert the voice command to an avionics system command;

determine whether the avionics system command can be performed;

perform the avionics system command when it is determined that the avionics system command can be performed;

provide a feedback when it is determined that the avionics system command cannot be performed;

enter error inquiry voice command, via a user interface, in response to the feedback;

receive the error inquiry voice command from the user interface;

convert the error inquiry voice command to an avionic system inquiry;

identify one or more parameters indicating that the avionics system command cannot be performed;

retrieve a state of the one or more parameters;

generate a message for a navigational display device, the message including a detailed reason for not performing the avionics system command including the one or more parameters and the retrieved state thereof; and forward the message to the navigational display device in response to the error inquiry voice command.

7. The flight deck system of claim 6 further configured to:

inputting, via the user interface, a manually entered error inquiry from a drop-down menu including a list of selectable error inquiries on a display;

receive the manually entered error inquiry; and convert the manually entered error inquiry into to the avionics system inquiry.

8. The flight deck system of claim 6, wherein to convert the voice command to the avionics system command, the flight deck system is configured to:

execute voice recognition software to convert the voice command into a text command;

access a post processing module in response to receiving the voice command and/or in response to converting the voice command to a text command; and convert the text command to an avionics system command using the post processing module.

9. The flight deck system of claim 6, further configured to:

execute voice recognition software to convert the error inquiry voice command into an error inquiry text command;

access an error inquiry database in response to converting the error inquiry voice command to an error inquiry text command; and convert the error inquiry text command to the avionics system inquiry.

10. A method for executing voice commands in an aircraft comprising:

receiving a voice command from a voice interface;

converting the voice command to an avionics system command;

determining whether the avionics system command can be performed;

performing the avionics system command when it is determined that the avionics system command can be performed;

providing a feedback when it is determined that the avionics system command cannot be performed;

entering an error inquiry voice command, via a user interface, in response to the feedback;

receiving the error inquiry voice command from the user interface;

converting the error inquiry voice command to an avionic system inquiry;

identifying one or more parameters indicating that the avionics system command cannot be performed;

retrieving a state of the one or more parameters;

generating a message for a navigational display device, the message including a detailed reason for not performing the avionics system command including the one or more parameters and the retrieved state thereof; and forwarding the message to the navigational display device in response to the error inquiry voice command.

11. The method of claim 10 further comprising:

inputting, via the user interface, a manually entered error inquiry from a drop-down menu including a list of selectable error inquiries on a display;

receiving the manually entered error inquiry; and converting the manually entered error inquiry into to the avionics system inquiry.

12. The method of claim 10, wherein the converting the voice command to the avionics system command comprises:

executing voice recognition software to convert the voice command into a text command;

accessing a post processing module in response to receiving the voice command and/or in response to converting the voice command to a text command; and converting the text command to an avionics system command using the post processing module.

13. The method of claim 10, wherein entering the user-based error inquiry further comprises:

executing voice recognition software to convert the error inquiry voice command into an error inquiry text command;

accessing an error inquiry database in response to converting the error inquiry voice command to an error inquiry text command; and converting the error inquiry text command to the avionics system inquiry.

* * * * *